United States Patent [19]
Willyoung

[11] 4,116,005
[45] Sep. 26, 1978

[54] COMBINED CYCLE POWER PLANT WITH ATMOSPHERIC FLUIDIZED BED COMBUSTOR

[75] Inventor: David M. Willyoung, Scotia, N.Y.

[73] Assignee: General Electric Company, Schenectady, N.Y.

[21] Appl. No.: 803,530

[22] Filed: Jun. 6, 1977

[51] Int. Cl.² .......................................... F01K 23/00
[52] U.S. Cl. .................................... 60/655; 122/4 D; 60/683
[58] Field of Search ............... 122/4 D; 60/650, 682, 60/683, 655, 39.18 B

[56] References Cited

U.S. PATENT DOCUMENTS

| | | | |
|---|---|---|---|
| 2,471,755 | 5/1949 | Karrer | 60/655 |
| 2,486,291 | 10/1949 | Karrer | 60/655 |
| 3,127,744 | 4/1964 | Nettel | 60/39.18 B |
| 3,234,735 | 2/1966 | Pirsh et al. | 60/39.18 B |
| 3,687,115 | 8/1972 | Bell | 122/4 D |
| 3,791,137 | 2/1974 | Jubb et al. | 122/4 D |
| 3,871,172 | 3/1975 | Villiers-Fisher | 60/682 |
| 3,884,193 | 5/1975 | Bryers | 122/4 D |
| 3,990,229 | 11/1976 | Staege | 60/39.02 |

OTHER PUBLICATIONS

NASA-CR 134949, p. 14.
*Electric World*, Dec. 15, 1976; pp. 39–41.

*Primary Examiner*—Allen M. Ostrager
*Attorney, Agent, or Firm*—John F. Ahern; James W. Mitchell

[57] ABSTRACT

A combined cycle steam and gas power plant is disclosed in which energy for generating steam to drive a steam turbine and for heating air to drive a gas turbine is provided by combustion of a single carbonaceous sulfur-bearing fuel such as coal at nearly atmospheric pressure in a sulfur-sorbing fluidized bed combustor. Fluidizing and combustion air for the combustor is furnished by exhaust from the gas turbine, and an air heat exchanger within the combustor allows indirect heating of air for driving the gas turbine so that corrosion of gas turbine hardware by the products of combustion is avoided.

9 Claims, 2 Drawing Figures

COMBINED CYCLE POWER PLANT WITH ATMOSPHERIC FLUIDIZED BED COMBUSTOR

BACKGROUND OF THE INVENTION

This invention relates to a combined steam turbine and gas turbine power plant for generating electric power. More specifically, if concerns a combined cycle power plant wherein a single carbonaceous fuel such as sulfur-bearing coal serves as the source of energy for driving thermodynamically coupled steam and gas turbines.

The basic concept of utilizing Rankine-cycle steam turbines and Brayton-cycle gas turbines in thermodynamically coupled combined cycle arrangements to achieve overall plant efficiencies higher than would be obtainable for either power cycle alone (operating over the same range of working fluid temperatures and pressures) is well known. Thermal energy which would be rejected from a simple cycle Brayton gas turbine plant and lost is utilized in combined cycle configurations to heat feedwater or steam for the Rankine-cycle steam turbine thereby achieving greater combined power generation for a given calorific input. The higher plant efficiencies achievable with combined cycles reduce fuel requirements and costs, as well as the quantity of undesirable plant effluents associated with the discharge of combustion products and reject heat to the environment. Since most fuels used for combustion power plants come from depletable fossil reserves, higher plant efficiencies are also desirable to conserve such reserves.

One of the present limitations on the use of integrated, high-efficiency combined cycle plants arises from the present purity requirements of gases used in gas turbines to avoid hot corrosion, fouling and rapid deterioration of gas turbine parts, particularly gas turbine blade surfaces. Current combined cycle plants are usually limited to burning natural gas or refined or specially treated petroleum fuels, which, unfortunately, are rapidly becoming less competitive in availability and price. Increasingly, in areas such as the United States, the use of coal for electric power generation rather than natural gas or petroleum is sought since indigenous coal reserves are much larger than those of oil or natural gas. While conventional Rankine-cycle steam power plants are more tolerant than gas turbines of combustion products due to fuel impurities, their efficiency is limited and in recent years has been reduced by the energy requirements of pollution control equipment which has been necessary, particularly when dirtier fuels such as high-sulfur coal is burned.

Various suggestions have been made to obtain the benefits of use of a single fuel such as coal as the source of energy in a combined steam and gas turbine cycle plant. One proposal, exemplified by U.S. Pat. Nos. 3,234,735 issued to Pirsh et al. and 3,990,229 issued to Staege, is to produce coal gas in the burning or partial oxidation of coal, pass the gas through cleaning and compression units, then into a gas turbine combustor for burning and subsequent expansion through a gas turbine. A significant disadvantage of this technique is that it requires rather complex gasifier equipment and cleaning apparatus, thus adding to overall plant cost. In addition, substantial losses in heating value of the gasified fuel are suffered in the coal to gas conversion. Use of gasifiers may also entail operating risks.

The large fuel conversion losses and other specific disadvantages of combined cycles which gasify and clean the primary fuel before combustion can be avoided in combined cycle systems which employ a furnace pressurized by the gas turbine compressor and a pressure-letdown gas turbine to recover energy from the expanding combustion gases. These systems are described and analyzed, for example, in the U.S. Government report NASA-CR 134949, "Energy Conversion Alternatives Study" (see Volume 1, FIG. 2, Page 14, for instance). A major obstacle to the widespread application of such pressurized furnace combined cycle systems is the difficult and costly system required to clean the hot combustion gases to a sufficient level that corrosion and fouling of the gas turbine blading and other system components is not excessive.

Another method of avoiding corrosion of turbine blading by coal combustion gases in a combined cycle is disclosed in U.S. Pat. No. 3,127,744 issued to Nettel wherein recirculating pebbles heated in a secondary furnace are arranged to cascade downward in counterflow to compressed air transferring heat thereto, the heated air then driving a gas turbine. Drawbacks associated with this system include the requirement of secondary burner, a rather complex pebble pump and distribution system, and the probable need of frequent scrubbing or cleaning of the pebbles to avoid contamination of airflow to the gas turbine. Moreover, although this system ostensibly permits operation with a variety of fuels, it does not address the problem of cleaning sulfur and other contaminants from the furnace exhaust gases.

Yet another proposed combined cycle arrangement is described in the Dec. 15, 1976 issue of *Electrical World*, pp. 39–41 in an article "Fluid-bed Technology Advances". In the cycle there suggested for use in a Curtiss-Wright pilot plant, coal is burned in a pressurized fluidized bed combustor with one-third of the gas turbine compressor airflow used as combustion air and the remaining two-thirds passing through a heat exchanger within the bed, the flows subsequently being recombined after cleaning of the combustion gases and then expanded through a gas turbine. One significant disadvantage of this configuration in common with most of the other arrangements noted previously is the cost of cleaning equipment for removing impurities from the hot stream of combustion gases passing in contact with the bed. Moreover, high levels of efficiency of this power plant are difficult to maintain as operating load is decreased because the fluidized bed temperature and hence the energy produced by the gas turbine tends to drop rapidly as the gas turbine compressor flow is reduced in correspondence with reduced fuel flow.

Accordingly, it is a general object of the invention to provide an economic combined cycle steam turbine and gas turbine power plant with high efficiency.

Another object of the invention is to provide an improved combined cycle steam turbine and gas turbine power plant which burns sulfur-bearing carbonaceous fuel such as coal in an environmentally clean manner without costly cleanup.

A further object of the invention is to provide an improved coal-fired combined cycle steam turbine and gas turbine power plant wherein unreliability due to gas turbine corrosion and fouling is avoided in a relatively simple arrangement of apparatus.

SUMMARY OF THE INVENTION

The objects of the invention are attained by providing in a combined cycle power plant a gas turbine and a steam turbine each of which may be drivably connected to separate dynamoelectric machines. A bed of sulfur-sorbing particles is included in a fluidized combustor bed, and in operation the particles are fluidized by the air exhaust of a gas turbine at nearly atmospheric pressure, the exhaust also furnishing oxygen to support combustion of carbonaceous fuel such as coal in the bed. By means of heat exchangers within the fluidized bed combustor, steam is produced for operation of the steam turbine and compressed air is heated for expansion through the gas turbine. Mechanical power produced by the turbines may be converted to electric power by dynamoelectric machines connected to the turbines or may be used to drive any appropriate load.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

DETAILED DESCRIPTION OF THE INVENTION

Figure 1:
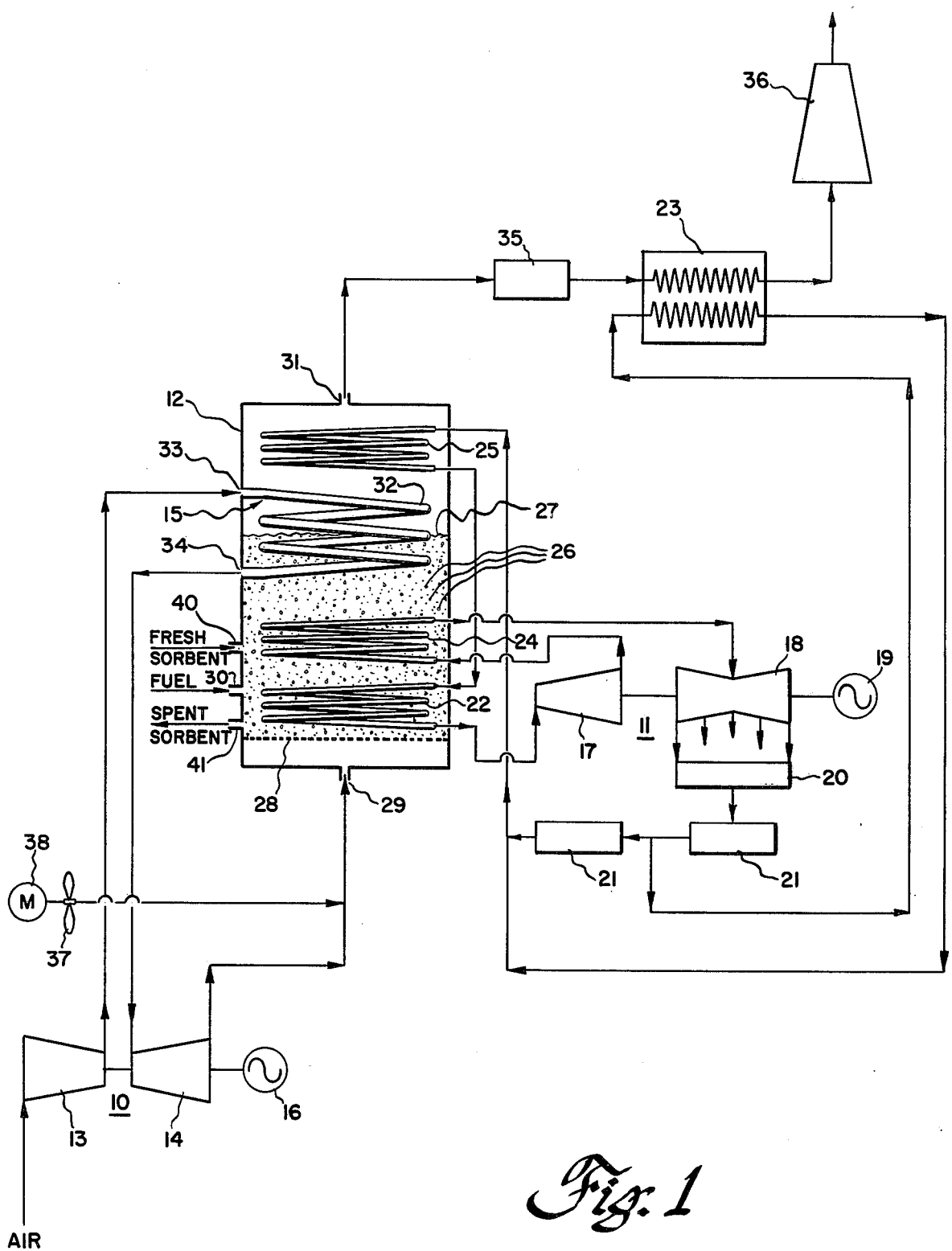
FIG. 1 is a simplified schematic of one arrangement of the combined cycle steam turbine and gas turbine power plant.

As is shown in FIG. 1, a gas turbine 10 is combined with a steam turbine 11, with motive fluids for driving both turbines provided by fluidized bed combustor 12.

Gas turbine 10 comprises a compressor section 13 and a turbine section 14 and is connected in driving relationship to load 16 which may be a dynamoelectric machine. Air used as the motive fluid in the gas turbine 10 is compressed in the compressor section 13, heated in an air heat exchanger 15 within the fluidized bed combustor 12 and expanded through turbine section 14.

The steam turbine 11, shown in a form representing only one of several configurations which can be utilized, comprises a high-pressure section 17 and a low-pressure section 18 and is connected in driving relationship to a second load 19 which may be a dynamoelectric machine. In order to generate steam for driving the steam turbine 11, condensate from the condenser 20 is heated in feedwater heaters 21, then passed through heat exchangers 25 and 22 in the fluidized bed combustor 12 where steam for the high-pressure section 17 is produced. An economizer 23 may be included for additional preheating of a portion of the feedwater and cooling of exhaust gases from fluidized bed combustor 12. Heat exchanger 24 in the combustor bed 12 is provided for reheating steam for the low-pressure section of the steam turbine 11. The location of the heat exchanger surfaces shown in fluidized bed combustor 12 is schematic only since in practice some of this surface, particularly for heat exchanger 22, will be physically located in the combustor walls.

The fluidized bed combustor 12 includes a plurality of sulfur-sorbing particles 26 forming a fluidized bed 27 which is suspended above a grate 28 by the steam of air which passes therethrough. The sulfur-sorbing particles 26 are preferably crushed limestone (calcium carbonate) or dolomite (calcium magnesium carbonate) typically ⅛ to ¼ inch in maximum dimension, which particles capture sulfur oxides during combustion of coal or other carbonaceous fuel and also promote heat transfer. The fluidized bed combustor 12 also includes a first inlet 29 for receiving air from the gas turbine exhaust to fluidize the bed 27 and support combustion, a second inlet 30 for receiving carbonaceous fuel such as coal fed into the fluidized bed 27, and an outlet 31 for discharge of combustion gases and other exhaust products. Fresh sulfur-sorbing particles 26 are supplied to the fluidized bed combustor 12 through a third inlet 40, and spent sorbing particles and ash solids are removed through exit port 41. The percentage of coal in the bed 27 is typically rather small — of the order of one percent or less by weight, and coal supplied to the bed is preferably in the form of particles ¼ inch or less in size.

Within the fluidized bed combustor 12 is an air heat exchanger 15 which includes heat exchange surface means 32 such as metal tubes and also includes an inlet 33 to receive compressed air from the gas turbine compressor section 13 and an outlet 34 to carry heated compressed air out of the fluidized bed combustor 12 for passage to and expansion through the turbine section 14 of the gas turbine 10. The heat exchanger tubes 32 are typically formed from high-temperature alloys with a high chromium content such as Inconel 601, Hastelloy X or Haynes Alloy 188, the alloys having good hot corrosion resistance and high-temperature strength. The tubes are closed so that air passing through the tubes does not mix with the fluidized bed material or combustion products of the fluidized bed combustor 12. Some of the metal tubes may be located above the fluidized bed 27; however, at least some of the tubes are preferably located within the bed 27 to raise the air temperature nearly to the bed temperature level to maximize power provided by expansion of the heated air through the turbine section 14 of the gas turbine 10.

Since cleaning of particulate matter from the fluidized bed combustor exhaust will usually be needed to satisfy emissions requirements, a dust separator 35 should be included in the power plant to remove ash and other solid matter from the exhaust prior to discharge through the stack 36. The dust separator 35 may consist of an electrostatic precipitator or a cyclone separator or both and may include means to collect solid matter for reprocessing and further combustion in the fluidized bed combustor 12 or in auxiliary carbon burnup cells (not shown).

Steam generating heat exchangers 22, 24, and 25 are located in and above the fluidized bed (and in the walls of combustor 12, although not shown) for furnishing throttle and reheat steam to steam turbine 11 which is arranged for high-efficiency regenerative steam extraction for feedwater heaters 21 in the conventional manner. Heat transfer surface above the bed cools the combustion gases leaving combustor 12 through exit 31 to a moderate temperature level so that dust separator 35 will be effective and so that economizer 23 can further reduce combustor gas exhaust temperature to a low level (200° to 300° F.) for minimal heat losses in the gases leaving stack 36.

Further provided is a forced draft fan 37 driven by auxiliary motor 38. The fan 37 furnishes fluidizing and combustion air to the fluidized bed combustor 12 for operation of the power plant by way of the steam cycle along if gas turbine power is not available or desired.

An air preheater (not shown) may also be included to transfer heat from the combustion gases leaving combustor 12 to the compressed air supply from compressor 13 prior to its entry into air heat exchanger 15 in the fluidized bed combustor 12. This will reduce the temperature of the combustion gases entering enconomizer 23 and the heat supplied to boiler feedwater therefrom, permitting a greater quantity of steam to be extracted from steam turbine 11 for feedwater heating in heaters 21 without increasing the final temperature of the feedwater entering steam-generating heat exchanger 25. This in turn reduces the steam flow passing to condenser 20, thereby further reducing thermal losses in the cycle. However, the potential incremental gain is small and does not appear to justify the added cost of the air preheater.

Operation of the improved combined cycle power plant is as follows. Air flowing through the gas turbine 10 is compressed in compressor section 13, then passes through the air heat exchanger 15 in the fluidized bed combustor 12 where it is heated by indirect thermal contact with fluidized bed materials and combustion products. The heated compressed air flows back to the gas turbine 10 where it expands through the turbine section 14 driving the gas turbine 10 and load 16. After expansion through the turbine section 14 the high-temperature exhaust air at nearly atmospheric pressure (but sufficiently higher to overcome pressure losses associated with flow through the bed combustor 12 and remainder of the system) flows into the fluidized bed combustor 12 where action of the air passing through the bed 27 of sulfur-sorbing particles 26 and coal fluidizes the bed 27, causing its materials to circulate and behave essentially as a fluid. The violent agitation of the particles 26 is effective in scavenging bed effluent gases of sulfur oxides as described below as well as in promoting heat transfer and uniform dispersion of fuel and sorbent materials through the bed volume.

Within the fluidized bed combustor 12, coal received through inlet 30 is burned and heat transferred to the air heat exchanger 15 and to steam heat exchangers 22, 24 and 25. Also within the combustor 12 the sulfur-sorbing particles undergo a chemical transformation. When introduced into the combustor through inlet 40, the particles 26 are typically crushed limestone (calcium carbonate) or dolomite (calcium magnesium carbonate), the latter undergoing chemical transformations analogous to those described herein for limestone. After entry into the combustor 12, the limestone particles are calcined by combustor heat, giving off carbon dioxide to form chemically active calcium oxide. As calcium oxide, the particles 26 are highly reactive over a limited but useful temperature range (1300°–1650° F.) with the oxides of sulfur produced during combustion of the sulfur-bearing coal. Calcium oxide particles 26 therefore react with oxygen and the gaseous oxides of sulfur (sulfur dioxide and sulfur trioxide) formed during combustion, producing solid calcium sulfate particles. The calcium sulfate particles 26 are then removed from combustor 12 through discharge ports 41 to maintain inventory and composition of the fluidized bed 27 at desired levels.

Exhaust gases from the combustion of coal leave the fluidized bed combustor 12 through outlet 31, pass through dust separator 35 where solid particulates are removed, then through economizer 23 where additional cooling occurs to reduce excess stack losses, and thence out through stack 36.

The steam cycle portion of the power plant operates on essentially a closed cycle which may be described as beginning with condensate in the condenser 20. Feedwater from the condenser 20 passes through feedwater heaters 21 (where it is heated in a well-known manner by steam extracted at various pressure levels from steam turbine 11), and in part through economizer 23 for preheating, then enters the fluidized bed combustor 12 where steam for the steam turbine high-pressure section 17 is generated in heat exchangers 25 and 22. After expansion through the high-pressure section 17, steam is reheated in heat exchanger 24 before expansion through the low-pressure section 18 of the steam turbine 11, thus driving the steam turbine 11 and associated load 19.

By way of example, in an exemplary cycle with the gas turbine furnishing about 20 percent of total plant power, gas turbine compressor section 13 operates at a pressure ratio of approximately 7, the operating temperature of the fluidized bed combustor 12 is approximately 1550° F. producing heated air for the gas turbine 10 at approximately 1500° F. and steam for the steam turbine 11 at approximately 1000° F., approximately 3500 psi. Fluidizing and combustion air from the gas turbine exhaust enters the fluidized bed combustor 12 at about 450° F. without depletion of the normal atmospheric oxygen content (23.2 percent by weight). The combustion gases leave the combustor at about 700° F. and are cooled to approximately 250° F. prior to discharge through the stack 36. Overall thermal efficiency for the combined cycle power plant is estimated at approximately 38.4 percent including all steam generator and auxiliary losses, about 4–5 percentage points higher than a conventional steam cycle power plant operating under similar conditions.

Figure 2:
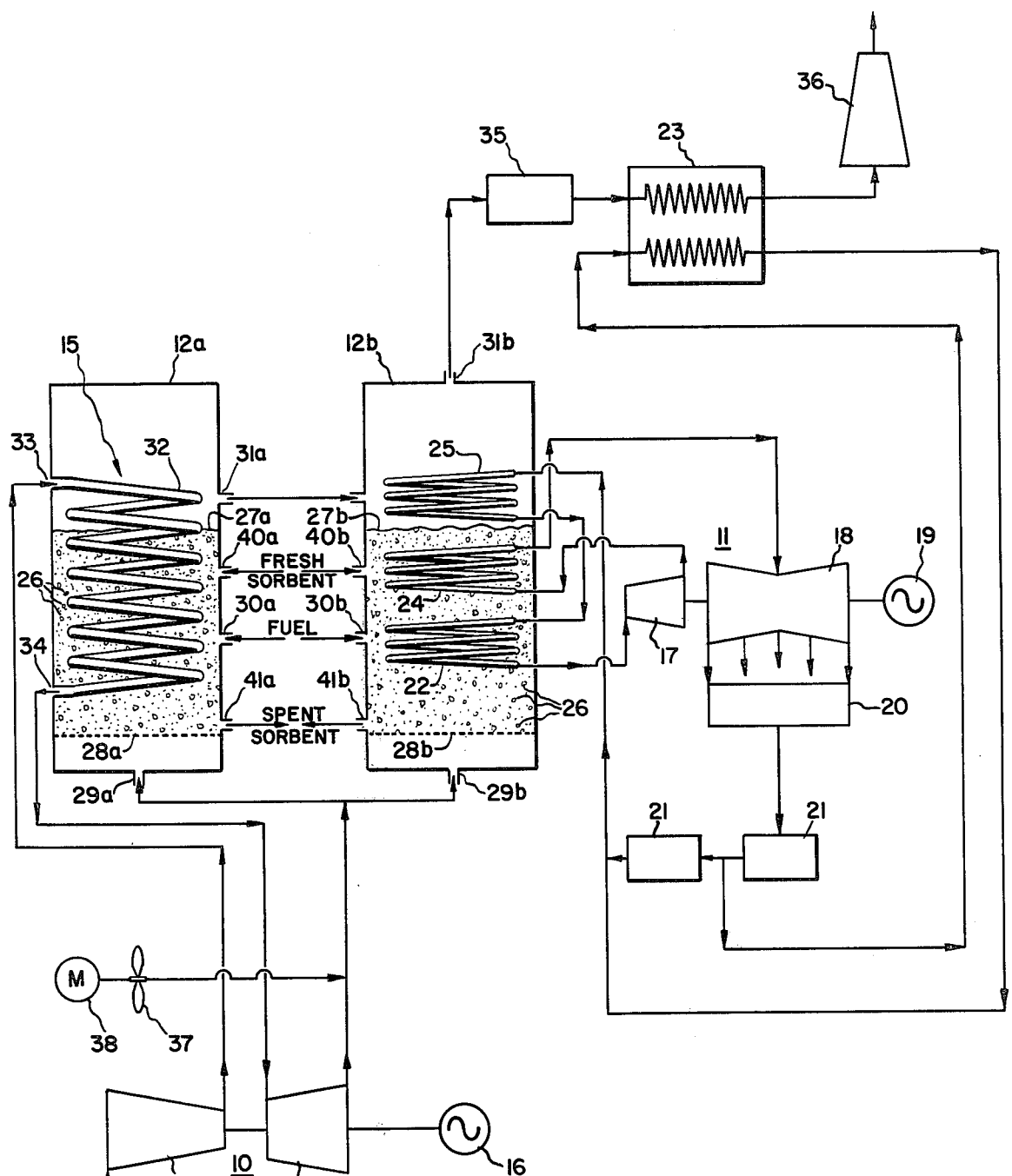
FIG. 2 is a schematic of a modified arrangement of the power plant including dual fluidized bed combustors.

A slightly modified combined cycle power plant is shown in FIG. 2 wherein separate fluidized bed combustors 12a and 12b are provided and combustor 12a heats air for driving the gas turbine 10 while combustor 12b generates steam for driving the steam turbine 11. In this configuration, which may facilitate placement of heat exchanger tubes of adequate surface area in and above the fluidized beds 27a and 27b, exhaust air from the turbine section 14 of the gas turbine 10 is split into separate streams to provide air for fluidizing and combustion in both fluidized bed combustors 12a and 12b. As shown, exhaust gas from bed combustor 12a may be passed into combustor 12b to aid in generation or reheat of steam. In addition to simplifying arrangement of heat exchanger tubes, this modified power plant configuration provides greater flexibility for varying height of the fluidized beds 27a and 27b and for varying flows of air and steam during operation at part power.

It will be recognized that a combined cycle plant has been described which avoids hot corrosion difficulties in the gas turbine by utilizing only air therein, which permits the use of sulfur-bearing coal as fuel, which avoids excessive emission of pollutants to the atmosphere without complex cleaning systems, and which achieves the high-efficiency benefits of combined steam and gas turbine cycles by the thermodynamic coupling of the two working fluids to minimize rejected heat.

While there has been shown and described what is considered a preferred embodiment of the invention, it is understood that various other modifications may be made therein. For example, all of the feedwater for the steam cycle may be preheated in the economizer 23 rather than only part of it. It is intended to claim all such modifications which fall within the true spirit and scope of the present invention.

What is claimed is:

1. A combined cycle steam turbine and gas turbine power plant comprising:
   (a) a gas turbine including a compressor section and a turbine section;
   (b) a fluidized bed combustor for combustion of carbonaceous sulfur-bearing fuel at nearly atmospheric pressure and in an environmentally clean manner, said combustor having a bed of fluidizable sulfur-sorbing particles, a first inlet for receiving fluidizing and combustion air at nearly atmospheric pressure from the turbine section of said gas turbine, a second inlet for receiving carbonaceous sulfur-bearing fuel, a third inlet for receiving sulfur-sorbing particles, a first outlet for discharge of gaseous and entrained solid particulate products, and a second outlet for discharge of spent sorbing particles and ash solids;
   (c) an air heat exchanger within said fluidized bed combustor, said heat exchanger including an inlet for receiving pressurized air from the compressor section of said gas turbine, heat exchange surface means allowing heating of the compressed air without intermixing of air heat exchanger air and fluidized bed combustor material, and an outlet to direct heated pressurized air out of the fluidized bed combustor for passage to the turbine section of said gas turbine;
   (d) a steam turbine; and
   (e) steam generating means in said fluidized bed combustor for furnishing steam to drive said steam turbine.

2. A combined cycle steam turbine and gas turbine power plant according to claim 1 wherein the carbonaceous sulfur-bearing fuel utilized in the fluidized combustor bed is coal in particulate form.

3. A combined cycle steam turbine and gas turbine power plant according to claim 1 further including a first dynamoelectric machine connected to and driven by said gas turbine and a second dynamoelectric machine connected to and driven by said steam turbine.

4. A combined cycle steam turbine and gas turbine power plant according to claim 1 wherein the fluidizable sulfur-sorbing particles of said fluidized bed combustor are selected from the group consisting of dolomite and limestone.

5. A combined cycle steam turbine and gas turbine power plant according to claim 4 wherein the heat exchange surface means of said air heat exchanger comprises heat exchanger tubes of corrosion-resistant metal.

6. A combined cycle steam turbine and gas turbine power plant according to claim 5 wherein a first portion of the heat exchanger tubes is located out of contact with the fluidized bed in the fluidized bed combustor and a second portion of the heat exchanger tubes is located within the fluidized bed.

7. A combined cycle steam turbine and gas turbine power plant according to claim 6 wherein said steam generating means in the fluidized bed combustor comprise heat exchangers, at least one of said heat exchangers located out of contact with the fluidized bed.

8. A combined cycle steam turbine and gas turbine power plant comprising:
   (a) a gas turbine including a compressor section and a turbine section;
   (b) a first fluidized bed combustor for combustion of carbonaceous sulfur-bearing fuel at nearly atmospheric pressure and in an environmentally clean manner, said combustor having a bed of fluidizable sulfur-sorbing particles, a first inlet for receiving fluidizing and combustion air at nearly atmospheric pressure from the turbine section of said gas turbine, a second inlet for receiving carbonaceous sulfur-bearing fuel, a third inlet for receiving sulfur-sorbing particles, a first outlet for discharge of gaseous and entrained solid particulate products, and a second outlet for discharge of spent sorbing particles and ash solids;
   (c) an air heat exchanger within said first fluidized bed combustor, said heat exchanger including an inlet for receiving pressurized air from the compressor section of said gas turbine, heat exchange surface means allowing heating of the compressed air without intermixing of air heat exchanger air and fluidized bed combustor material, and an outlet to direct heated pressurized air out of said first fluidized bed combustor for passage to the turbine section of said gas turbine;
   (d) a second fluidized bed combustor for combustion of carbonaceous sulfur-bearing fuel at nearly atmospheric pressure and in an environmentally clean manner, said combustor having a bed of fluidizable sulfur-sorbing particles, a first inlet for receiving fluidizing and combustion air at nearly atmospheric pressure from the turbine section of said gas turbine, a second inlet for receiving carbonaceous sulfur-bearing fuel, a third inlet for receiving sulfur-sorbing particles, a fourth inlet for receiving gaseous and entrained solid particulate products of said first fluidized bed combustor, a first outlet for discharge of gaseous and entrained solid particulate products, and a second outlet for discharge of spent sorbing particles and ash solids;
   (e) a steam turbine; and
   (f) steam generating means in said second fluidized bed combustor for furnishing steam to drive said steam turbine.

9. A combined cycle steam turbine and gas turbine power plant according to claim 7 further including means for removing solid particulate products dischargeable from said first outlet of said fluidized bed combustor, and means for furnishing fluidizing and combustion air to said combustor independent of said gas turbine.

* * * * *